Figure 1:
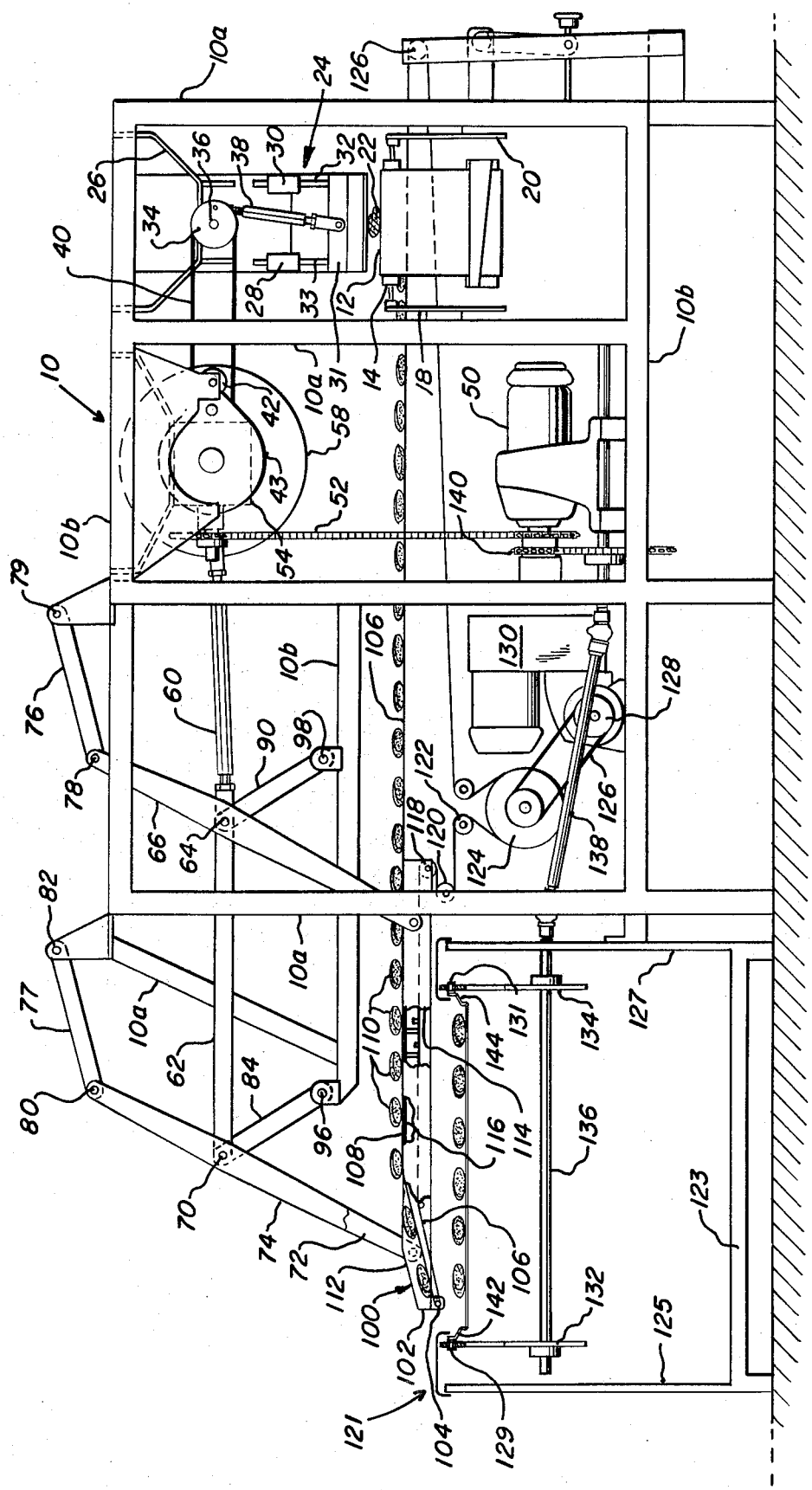

United States Patent [19]

Burgess

[11] 3,759,126
[45] Sept. 18, 1973

[54] TRANSFERRING, CUTTING AND DEPOSITING APPARATUS FOR BAKERY GOODS

[75] Inventor: Ralph D. Burgess, Excelsior, Minn.

[73] Assignee: The Pillsbury Company, Minneapolis, Minn.

[22] Filed: May 12, 1972

[21] Appl. No.: 255,877

[52] U.S. Cl.............. 82/112, 83/155, 83/157, 83/356.2, 83/734, 198/31 AB
[51] Int. Cl....... B26d 4/46, B26d 5/22, B65g 47/26
[58] Field of Search............... 198/31 R, 31 AA, 198/31 AB, 139, 20, 30; 83/155, 157, 734, 83/112, 356.2

[56] References Cited
UNITED STATES PATENTS

| | | | |
|---|---|---|---|
| 3,550,749 | 12/1970 | Story | 198/31 AB |
| 3,150,761 | 9/1964 | Pinault et al. | 198/31 AB |
| 3,556,280 | 1/1971 | Schnee et al. | 198/31 AB |
| 3,464,299 | 9/1969 | Gagnon | 83/155 X |
| 1,180,030 | 4/1916 | Green | 83/155 X |
| 1,993,586 | 3/1935 | Bech | 83/157 X |
| 3,294,216 | 12/1966 | Girardi | 198/139 |

Primary Examiner—Andrew R. Juhasz
Assistant Examiner—James F. Coan
Attorney—Ronald E. Lund et al.

[57] ABSTRACT

A strip of dough is fed continuously through a cutter consisting of a reciprocating blade which slices the dough strip into pieces of equal thickness. The cut pieces fall onto a horizontally disposed endless belt conveyor that transfers them onto a carriage adapted to be moved along an axis aligned with the direction of motion of the pieces on the conveyor. The carriage includes first and second conveyor belt rolls. The first is located at the free end of the carriage and the second is located at the end of the carriage closest to the cutter. The carriage is supported at the lower end of downwardly hanging support links connected at their upward ends to rocker links which are secured to a supporting framework. Each support link is pivotally connected at its center to a toggle link which is pivoted to the framework at its lower end. The pivot point between the support link and the toggle link is oscillated by a connecting rod secured at its other end to a rotating crank. In this way the links support the carriage and cause it to reciprocate along a stright line thereby depositing the pieces in aligned rows on a tray conveyor beneath the carriage.

10 Claims, 3 Drawing Figures

TRANSFERRING, CUTTING AND DEPOSITING APPARATUS FOR BAKERY GOODS

FIELD OF THE INVENTION

The present invention relates to dough handling equipment and more particularly to an apparatus for cutting a dough strip into pieces and conveying the pieces to an article receiving surface and arranging them in colums and rows.

THE PRIOR ART

A variety of different machines have been proposed for conveying dough products to baking pans or trays moving at right angles to a conveyor with a provision for causing the free end of the conveyor to oscillate on a horizontal path oriented at approximately right angles to the direction of travel of the trays and a means for withdrawing or peeling back the conveyor belt from beneath the dough bodies while the belt continues to move at a fixed speed with reference to a stationary object thereby transferring the articles onto the trays. Some of these devices have been operated by pneumatic actuators. However, it was found that when a speed of about one hundred cuts per minute is exceeded, the pneumatic device will not reciprocate the conveyor carriage peel-back section at the proper speed or readily withstand stresses and loads encountered. Moreover it is difficult if not impossible to properly synchronize the movement of a pneumatically actuated carriage. As a result, the columns and rows of cut dough pieces on the trays will not be properly aligned. It was found that when limit switches are used for controlling the operation of such a machine, synchronization is poorly controlled at delivery speed of over one hundred sixty units per minute.

Mechanical carriage operating units have also been previously proposed. See, for example, in U.S. Pat. Nos. 3,150,761 and 3,556,280. These machines, however, require rolls and other supporting mechanism to align, guide and support the carriage and a linkage drive arrangement for moving the carriage. This complicates and makes the equipment expensive. Furthermore, there is no reliable provision for consistently cutting the dough and positioning the dough in a specified location so that it can be accurately placed on the conveyor trays when the apparatus operates at relatively high speeds. For example, a switch machanism is described in one of the patents for sensing the position of the dough and advancing the conveyor a predetermined distance and then causing the conveyor to stop until the next dough piece is received. The present apparatus is however, concerned with cutting and advancing dough pieces at speeds almost faster than can be followed with the eye, e.g. speeds of over one hundred fifty pieces per minute or about three per second.

OBJECTS OF THE INVENTION

The primary objects of the invention are a) the provision of the transferring apparatus for cut dough pieces in which a combined, supporting and transferrring function is provided by machine elements connected to a conveyor carriage; b) means for imparting uniform, harmonic motion to a peelaway type transfer carriage with provision for maintaining smooth uniform speed of operation of the conveyor carriage and associated structure to thereby minimize wear and vibration, reduce the number of parts required; c) reliable synchronization of piece position with oscillatory movement of the conveyor carriage without depending upon the operation of limit switches and the links; d) provision for imparting oscillatory motion to the carriage along the horizontally disposed rectilinear axis; e) reliable operation, low cost, and simplicity of construction, and f) a capability of operating at the rate of at least two hundred forty pieces per minute.

FIGURES

Figure 2:
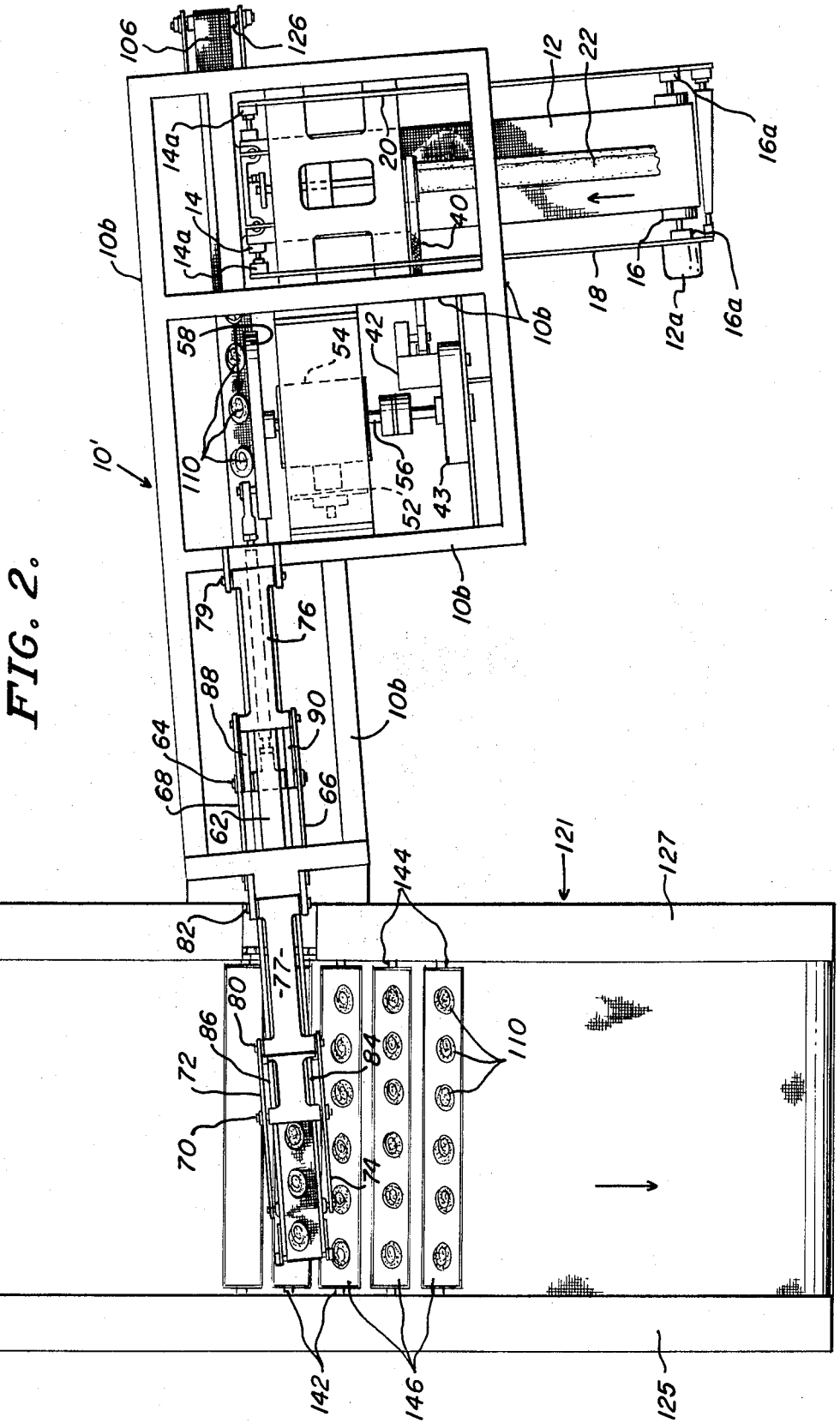
Figure 3:
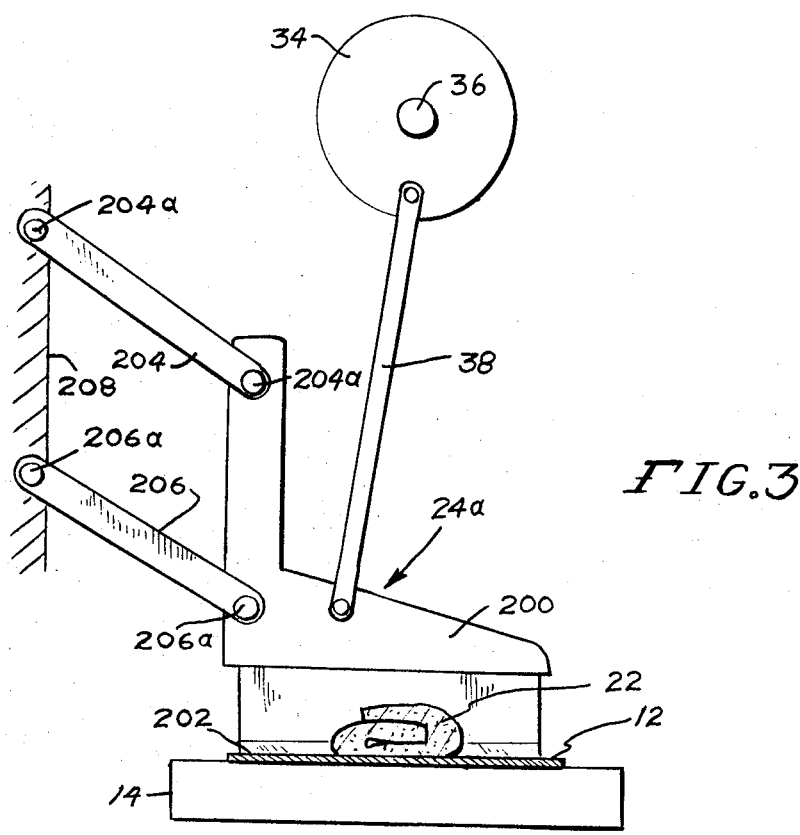

FIG. 1 is a side elevational view of the apparatus partly broken away.
FIG. 2 is a plan view of the apparatus.
FIG. 3 is an elevation of another form of cutter.

SUMMARY OF THE INVENTION

A strip of dough is fed through a cutter which slices the dough strip into pieces. The cut pieces are then moved to a feed location by a conveyor which transfers them to a carriage adapted to be moved along an axis aligned with the direction of motion of the pieces on the conveyor.

In one preferred embodiment of the invention the carriage is provided with conveyor belt rolls. One roll is located at the free end of the carriage. Another is located at the end of the carriage closest to the cutter. A portion of the conveyor is entrained over these rolls. The carriage is supported at the end of support links operatively connected to a supporting framework. Each support link is preferably connected near its center to a toggle link which is itself pivoted to the framework at its other end. The carriage is oscillated by a rotating crank. The links support the carriage and allow oscillatory motion along a horizontal axis to be imparted to it by the crank. This enables the cut pieces to be delivered from the free end of the carriage to a receiving station or the like below the carriage.

THE PREFERRED EMBODIMENT

As shown in the figures, the apparatus includes the supporting framework 10 composed of uprights 10a and horizontal members 10b suitably connected together as by welding. At the right end of the apparatus as seen in figures is an inlet or feed conveyor 12 composed of an endless conveyor belt entrained over a plurality of horizontally spaced rolls designated 14 and 16 as best seen in FIG. 2 which are mounted for rotation in bearings 14a and 16a respectively that are, in turn, mounted upon vertically disposed parallel laterally extending side plates 18 and 20.

The roll 16 is suitably driven at the desired speed by a controllable speed motor 12a. The drive motor 122 is made of variable and controllable speed so that the thickness of the cut pieces to be described below can be accurately determined. Thus, by running the conveyor 12 at a faster speed, the cut pieces will have a greater thickness, thereby allowing accurate control of the piece weight.

An elongated or endless strip of dough 22 is fed continuously onto the upper surface of the conveyor 12 and is conveyed thereby toward the cutter to be described below. The dough strip, 22, can have a variety of shapes but in a typical situation consists of a spiral of cinnamon coated sweet dough for making coffee cakes and the like.

The dough traveling upon the conveyor 12 travels into the cutter indicated generally at 24. The cutter consists of a bracket 26 connected to a framework member 10b at the top of the framework 10 and is provided with a pair of vertically disposed laterally spaced blade guides 28 and 30 upon which the dough cutter blade 31 is supported for vertical sliding movement upon rods 32 and 33 that extend through the guides 28 and 30 respectively. Reciprocation is imparted to the blade 31 by the crank 34, journaled at 36 upon the bracket 26 and coupled to the blade by connecting rod 38. The crank 34 is in turn powered by a timing belt and pulley assembly 40, which is coupled to a speed change gear box 42, and that is in turn connected through a 5 to 1 speed increaser 43. Speed increaser 43 is driven by a motor 50, which is connected by a chain and sprocket assembly 52, to a 2 to 1 ratio speed increaser 54 having an output shaft 56 coupled to the speed increaser 43.

The drive arrangement for the depositing conveyor and carriage will now be described. One end of shaft 56 is connected to a crank 58. The crank 58 is in turn, coupled by connecting rod 60 to a crosshead 62 at pivot 64. The crosshead is connected by pivot 64 to laterally spaced inclined support links 66 and 68 and by a transverse pivot 70 at its forward end to a pair of inclined support links 72 and 74. Links 66 and 68 are pivotally connected at their upward ends to the framework by means of the rocker link 76 and pins 78 and 79. Similarly, links 74 and 72 are connected at their upper ends to the framework by means of a rocker link 77 and by means of a pair of pivot pins 80 and 82. Pivot pins 70 and 64 are connected to the framework by toggle links 84, 86, and 90 respectively. Links 84 and 86 are connected to the framework by a pivot pin 96, while links 88 and 90 are connected to the framework by a pin 98 (FIG. 1).

While the lengths of the links can be varied, one satisfactory set of dimensions is as follows:

TYPICAL LINK DIMENSIONS

| Part | Length in Inches |
|---|---|
| Links 76 and 77 | 17 11/64 |
| Upper part of links 72–74 & 66–68 | 17 5/32 |
| (Overall length) | 40 35/64 |
| Links 84, 86 & 88, 90 | 12 31/32 |
| Vertical height of 82 above 96 | 28 |
| Horizontal distance between 82 & 96 | 17 11/64 |

The bar linkage described allows straight rectilinear motion of the conveyor carriage 100 through a distance of 32 inches. The linkage also provides a relatively long life, low maintenance support for the carriage as well as imparting oscillatory movement to the carriage.

It should be understood that the above dimensions need not be followed precisely since exact rectilinear motion is not always required. Moreover, changes can sometimes be made in the dimensions since by shortening one of the dimensions others can be shortened or lengthened to provide compensation. It should be understood that all that is needed is a first pair of relatively long support links which are connected to support the carriage at their lower ends with rocker links between their upper ends and the framework of the apparatus, and toggle links pivoted between the support links and the framework with a crank which functions to impart horizontal oscillatory movement to the links. If desired, the entire linkage arrangement can be inverted with the links located underneath the carriage rather than on top of it. However, in this case, the free end of the carriage will have to be cantilevered.

The carriage 100 and associated conveyor structure will now be described. As shown in the figures the inlet end of the carriage is at the right while the outlet end is at the left having a transversely extending idler roll 104 mounted thereon to provide a support for an endless conveyor belt 106. The carriage includes the product support section 108 to which product 110 are supplied by the cutter 24. The roll 104 is mounted for rotation between side plates 112 and 114. A horizontally disposed plate 116 is mounted rigidly as by welding between plates 114 and 112 to support the overlying conveyor belt section. At the trailing end of the carriage 100 is another idler roll 118. Mounted upon the framework below roll 118 is an idler roll 120. A section of the belt 106 is entrained around rolls 118 and 120, hence around roll 122 and over driving drum 124, which is connected to the drive motor 50 through a chain sprocket assembly 126, to speed reducer 128, which is in turn driven by an independent motor 130.

The conveyor 121 onto which the articles 110 are deposited can be of any suitable construction. The conveyor 121 can be an inlet conveyor leading to an oven, proofing cabinet or fryer depending upon the use to which the invention is placed. The conveyor 121 includes the supporting framework 123, having vertically disposed parallel laterally extending sidewalls 124 and 127, and the moving endless conveyor element comprising chains 129 and 131, entrained at one end over sprockets 132 and 134 which are mounted upon a shaft 136 that is driven by a shaft 138 which is connected via chain and sprocket assembly 140 to the drive motor 50. The chains 129 and 131 have connected to them by means of supporting brackets 142 and 144 and plurality of trays 146 upon which the articles 110 are deposited during the operation.

The operation of the apparatus will now be described. It will be assumed first that the motors 50 and 130 are energized and are running at the proper speed. The speed of the motor 50 can be controlled conveniently by a variable speed motor control (not shown) of a suitable construction such as a Varydyne Unit, which is commercially available from the Company of U.S. Electrical Motors Division of Lionell Corporation of Millford, Conn. The transmission 42 is then shifted to the proper speed to drive the cutter knife 31 at the speed required to deliver the proper number of pieces in one lateral row of pieces on the trays 146, and the motor 12a used for driving conveyor 12 is then energized and is driven at the appropriate speed relative to the speed of the knife 31 to properly regulate the thickness of the cut pieces 110. As the dough strip 22 travels beneath the cutter 31, it is sliced at regularly spaced intervals by the knife and is allowed to fall onto the conveyor belt 106 which travels from right to left as seen in the figures. It can also be seen that the motor 50 will impart motion to the crank 58 thereby causing the bar linkage and toggle assembly (links 62 – 90) to oscillate from left to right at a speed coordinated with the speed of the belt 106 to thereby periodically deposit the articles 110 in even rows across the trays 146 at evenly spaced intervals as the portion of the belt upon the plate 116 is periodically peeled from beneath the articles 110 during the interval in which the carriage moves from left to right in the figures. In this way, it has been found possible to deposit as many as four articles per second. Since the carriage 112 moves toward the left and does no depositing during the half of this time, the actual speed of delivery of the cut pieces 110 is about eight per second in the interval in which pieces are being transferred to the trays.

The invention very effectively delivers cut pieces of dough at uniformly spaced intervals as well as inabling the weight of the pieces to be accurately controlled in part because the cutter 31 is driven and precise synchronization with the conveyor 106 and carriage drive assembly. The bar linkage is especially effective in operating at relatively high speeds with little wear or stress upon operating parts. It also provides the dual purpose of supporting the conveyor carriage and driving the same. Moreover, the linkage assembly provides rectilinear oscillatory motion in a horizontal plane and thereby prevents the pieces from being bounced or disturbed as they are advanced which, if allowed to occur, could cause the pieces to become misaligned. The apparatus moreover, is adapted to advance the pieces at relatively high speeds as well as being rugged in construction and reliable in operation.

The inlet or feed conveyor 12, and the transfer conveyor 106 are provided with independent and selectively controllable drive means. The drive for the receiving conveyor, 121, is mechanically connected to the transfer conveyor 106, the support bar linkage assembly to impart oscillatory movement thereto and to the cutting knife, 31, for imparting reciprocating movement thereto to thereby synchronize the motion of the carriage, 112, the receiving conveyor, 121, and the cutting knife, 31.

A modified form of cutting mechanism 24a is illustrated in FIG. 3. As shown in the figure the crank 34 rotating on support shaft 36 is connected via the connecting rod 38 to a blade 200 having a sharpened cutting edge 202 adapted to cut the dough strip 22 each time the connecting rod 38 reaches the bottom of the stroke. In this instance, the blade 200 is supported by a pair of parallel supporting links 204 and 206 which are connected by means of pivots 204a and 206a respectively to a portion of the framework 208 or other stationary object. In operation, the rotation of the crank 34 repeatedly raises and lowers the connecting rod 38 and the blade 200 thereby making repeated cuts in the dough strip 22. Since the blade 200 is supported by the connecting links 204 and 206 which are spaced vertically from one another and extend laterally to the framework, the blade 200 will remain vertical but will travel through an arcuate and circular path extending downwardly and toward the right as the crank moves the connecting rod 38 in a downward direction thereby slicing the strip 22 with a lateral sliding action so as to minimize compression of the dough owing to the greater ease of cutting due to the lateral sliding component of motion. As a result of this provision, delicate pieces of dough can be cut with less damage. Thus the cutter of FIG. 3 has a provision for moving the blade along the path normal to its cutting edge 202 and at the same time moving it parallel thereto in the plane of the blade to provide a slicing action.

What is claimed is:

1. A dough cutting and transferring apparatus comprising a supporting framework, means for feeding a strip of dough through a cut-off device consisting of a moveable blade for slicing the dough strip into a plurality of pieces, a horizontally disposed endless transfer conveyor to receive the cut pieces and transfer said pieces onto a carriage adapted to be moved longitudinally with respect to the horizontal conveyor, said carriage including first and second conveyor rolls, the first roll being located at the free end of the carriage and the second being located at the end of the carriage closest to the cutter and said transfer conveyor being entrained over said rolls, said carriage being mounted upon support links operatively connected at one end to the supporting framework, a toggle link pivotally connected to each support link intermediate the ends thereof at one end and to the framework at its other end, the carriage being pivotally connected to the free ends of the support links and drive means synchronized with the horizontal conveyor and cutter for imparting horizontal oscillatory motion to the carriage along an axis substantially aligned with the motion of the cut pieces on the transfer conveyor.

2. The apparatus of claim 1 wherein said support links comprise first and second laterally aligned pairs of links having said toggle links connected to each of them intermediate their ends, the carriage being pivotally connected to the free ends of the support links and the upper ends of the support links being connected by means of rocker links to the framework of the apparatus.

3. The apparatus of claim 1 wherein the cutter comprises a blade mounted for repeated oscillatory movement for severing said dough repeatedly as the dough product is advanced, a drive for the cutter, said cutter drive being connected mechanically to the drive for the carriage whereby the reciprocating carriage movement is synchronized with the cutter.

4. The apparatus of claim 1 including an endless conveyor element entrained over rotatable drive members for conveying an elongated strip of uncut dough to the cutter, drive means for the cutter for imparting oscillatory movement to the cutter and said cutter drive means being mechanically connected to the carriage for imparting oscillatory motion to the carriage to thereby synchronize cutting and piece delivery from the carriage.

5. The apparatus of claim 1 wherein the cutter drive is connected mechanically to the means oscillating the carriage, and receiving conveyor is provided beneath the delivery end of the transfer conveyor, said receiving conveyor is mechanically connected to said cutter drive means and an independent drive is operatively connected to the conveyor feeding the cutter drive means.

6. The apparatus of claim 1 wherein three endless conveyors are provided including a feed conveyor for transferring the elongated strips of dough to the transfer conveyor, the transfer conveyor intersecting the outlet end of the feed conveyor and a receiving conveyor positioned beneath the downstream end of the transfer conveyor for receiving the cut pieces delivered thereby, first and second independently and selectively controllable drive means for the inlet conveyor and the transfer conveyor respectively to enable the thickness of the cut pieces to be selectively changed as desired.

7. The apparatus of claim 1 wherein the cutter drive is connected mechanically to the means oscillating the carriage, a receiving conveyor is provided beneath delivery end of the transfer conveyor, said receiving conveyor is mechanically connected to said cutter drive means and an independent drive is operatively connected to the conveyor feeding the cutter for imparting motion thereto whereby the spacing of the cut pieces can be controlled by changing the speed of the transfer conveyor relative to said cutter drive means, three endless conveyors are provided including a feed conveyor for transferring the elongated strips of dough to the transfer conveyor, the transfer conveyor intersecting the outlet end of the feed conveyor and a receiving conveyor positioned beneath the downstream end of the transfer conveyor for receiving the cut pieces delivered thereby first and second independently and selectively controllable drive means for the inlet conveyor and the transfer conveyor respectively to enable the thickness of the cut pieces to be selectively changed as desired.

8. The apparatus of claim 1 wherein said cut-off device comprises a blade mounted for simultaneous movement along an axis to its edge and parallel thereto within the plane of the blade to thereby slice the dough strip as it is cut.

9. The apparatus of claim 8 wherein the cut-off device comprises a blade mounted for movement upon an accurate path to provide a slicing action as the dough strip is cut.

10. The apparatus of claim 9 wherein the blade is mounted on a pair of parallel supporting arms each pivotally connected at one end to the blade and at the other end to a stationary object and a drive means is connected to said blade for imparting oscillation thereto.

* * * * *

UNITED STATES PATENT OFFICE
CERTIFICATE OF CORRECTION

Patent No. 3,759,126      Dated September 18, 1973

Inventor(s) Ralph D. Burgess, Jr.

It is certified that error appears in the above-identified patent and that said Letters Patent are hereby corrected as shown below:

On the cover sheet [75] "Ralph D. Burgess, Excelsior, Minn." should read -- Ralph D. Burgess, Jr., Excelsior, Minn. --.

Signed and sealed this 27th day of August 1974.

(SEAL)
Attest:

McCOY M. GIBSON, JR.      C. MARSHALL DANN
Attesting Officer      Commissioner of Patents